United States Patent
Wood, Jr.

(10) Patent No.: US 6,874,583 B2
(45) Date of Patent: Apr. 5, 2005

(54) QUICK COUPLER ASSEMBLY

(75) Inventor: Robert Lee Wood, Jr., Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/386,304

(22) Filed: Mar. 11, 2003

(65) Prior Publication Data

US 2004/0188111 A1 Sep. 30, 2004

(51) Int. Cl.[7] .............................................. A01B 59/043
(52) U.S. Cl. ..................... 172/439; 280/416.1
(58) Field of Search ............................. 172/439, 451; 280/416.1, 416.2, 460.1, 479.1

(56) References Cited

U.S. PATENT DOCUMENTS

| | | | | |
|---|---|---|---|---|
| 3,151,883 A | * | 10/1964 | Stuart | 172/248 |
| 3,231,294 A | * | 1/1966 | Horney | 172/272 |
| 3,472,528 A | * | 10/1969 | Richey et al. | 280/416.2 |
| 3,561,788 A | * | 2/1971 | Carlson et al. | 280/461.1 |
| 3,722,915 A | * | 3/1973 | Gail | 172/439 |
| 3,829,128 A | * | 8/1974 | Sutton | 172/272 |
| 4,195,860 A | * | 4/1980 | Helams | 172/451 |
| 4,340,240 A | * | 7/1982 | Anderson | 280/461.1 |
| 5,026,247 A | * | 6/1991 | Zimmerman | 414/703 |
| 5,582,255 A | * | 12/1996 | Nikkel et al. | 172/6 |
| 5,692,573 A | * | 12/1997 | Zahn et al. | 172/439 |
| 5,697,454 A | * | 12/1997 | Wilcox et al. | 172/447 |
| 5,950,735 A | * | 9/1999 | Godbersen | 172/439 |
| 6,478,094 B2 | * | 11/2002 | Alexander et al. | 172/439 |

OTHER PUBLICATIONS

Farm Show, May–Jun. 1993 vol. 17, issue 3, p. 34.*
ASAE, "Attachment of Implements to Agricultural Wheel Tractors Equipped with Quick–Attaching Coupler—ASAE Standards 1999", pp. 104–105, 1995.
John Deere, "Tractors—FMO", p. 191, 1981.

* cited by examiner

Primary Examiner—Robert E. Pezzuto
Assistant Examiner—Nathan S Mammen

(57) ABSTRACT

An implement quick coupling mechanism for a work vehicle includes a frame having a cross member and left and right side members projecting from the cross member. The cross member and side members have mounting parts which permit different implement coupling parts to be mounted thereon. A first set of hook members having a first type of dimensional characteristics may be mounted on the frame to form a first category of coupling mechanism. A second set of coupling members having a second type of dimensional characteristics may be mounted on the frame to form a second category of coupling mechanism.

6 Claims, 4 Drawing Sheets

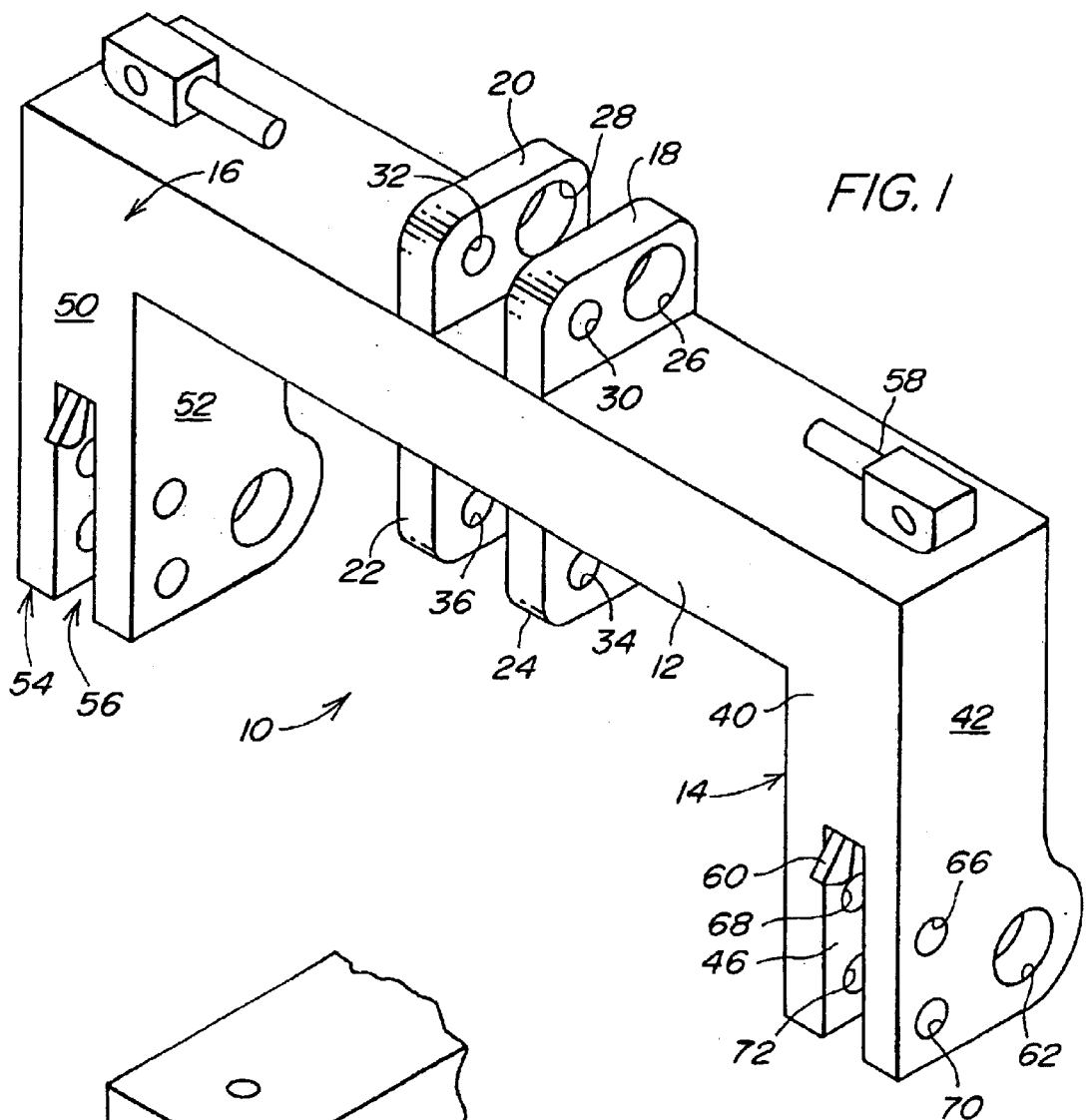
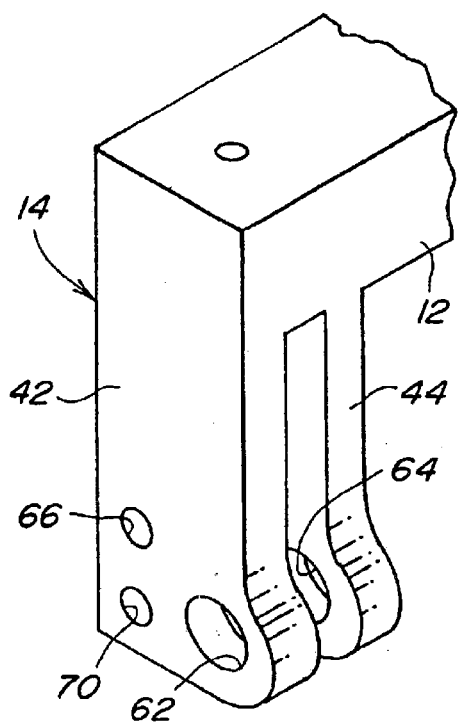
FIG. 1
FIG. 2

US 6,874,583 B2

QUICK COUPLER ASSEMBLY

BACKGROUND

The present invention relates to a quick coupler for attaching an implement to a vehicle such as an agricultural tractor.

Different sized tractors are normally provided with different sized implement hitches. For example, standards require that larger tractors be provided with a larger category 4N hitch, whereas smaller tractors are normally provided with a smaller category 3 hitch. It is also known to mount a quick coupler to a tractor hitch and then couple an implement to the quick coupler. A larger category 4 quick coupler is normally mounted on a larger category 4 hitch. Yet, there are many hitch-coupled implements which are designed to be coupled with a category 3 hitch. Therefore, it would be desirable to have a quick coupler which can be mounted on a category 4 hitch and which can be modified or adapted to be coupled to either a category 3 or category 4N implement.

SUMMARY

Accordingly, an object of this invention is to provide an adjustable quick coupler mechanism.

A further object is to provide a quick coupler which can be converted to different standard dimensions.

These and other objects are achieved by the present invention, wherein a quick coupler mechanism includes a frame having a cross member and left and right side members projecting from the cross member. A first set of hook members having a first type of dimensional characteristics may be mounted on the frame to form a first category of coupling mechanism. A second set of coupling members having a second type of dimensional characteristics may be mounted on the frame to form a second category of coupling mechanism.

BRIEF DESCRIPTION OF THE DRAWINGS

FIG. 1 is a perspective view of a quick coupler frame according to the present invention;

FIG. 2 is a perspective view from the front of a portion of the frame of FIG. 1;

DETAILED DESCRIPTION

Figure 4:
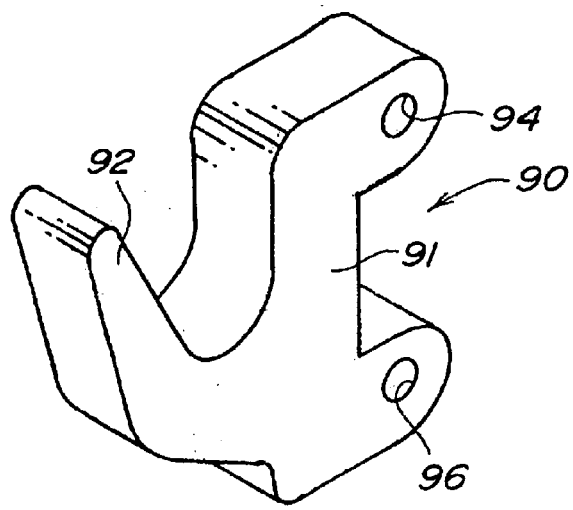
FIG. 4 is a perspective view of a category IV top hook which may be used in place of the hook of FIG. 3A.

Referring to FIGS. 1 and 2, a quick coupler assembly includes a quick coupler frame 10 having upper cross member 12 and right and left downward extending side members 14 and 16. A pair of upper mounting tabs 18 and 20 are spaced apart and project upwardly from a top surface of cross member 12. A pair of lower mounting tabs 22 and 24 are spaced apart and project downwardly from a bottom surface of cross member 12. Tabs 18 and 20 include a forward pair of aligned bores 26 and 28 for use in coupling the frame 10 to a tractor (not shown). Tabs 18 and 20 also include a pair of rear aligned hook coupling bores 30 and 32. Tabs 22 and 24 include a pair of aligned hook coupling bores 34 and 36.

Right side member 14 includes a rear plate 40 and a pair of spaced apart side plates 42 and 44. Rectangular slot 46 extends upwardly from the lower end of plates 40. Left side member 16 includes a rear plate 50 and a pair of spaced apart side plates 52 and 54. Rectangular slot 56 extends upwardly from the lower end of plates 50. Each side member preferably includes a conventional hook latching mechanism, including handle portion 58 and latch lever portions 60 which are shown in FIG. 1. Since left side member 16 is a mirror image of right side member 14, the following description will be directed only to right side member 14.

A forward pair of aligned bores 62 and 64 for use in coupling the frame 10 to a tractor hitch draft link (not shown) extend through a lower end of plates 42 and 44. A pair of aligned upper rear hook coupling bores 66 and 68 extend through the lower end of plates 42 and 44. A pair of aligned lower rear hook coupling bores 70 and 72 extend through the lower end of plates 42 and 44, spaced apart from and below bores 66 and 68.

Figure 3A:
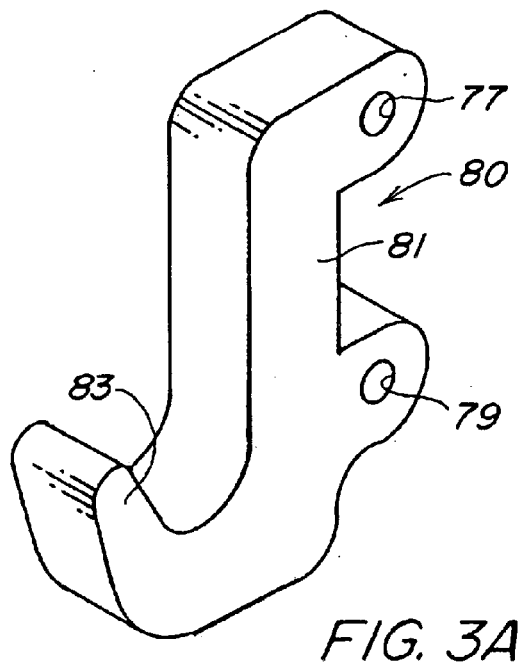
FIG. 3A is a perspective of a category III top hook.
Figure 3B:
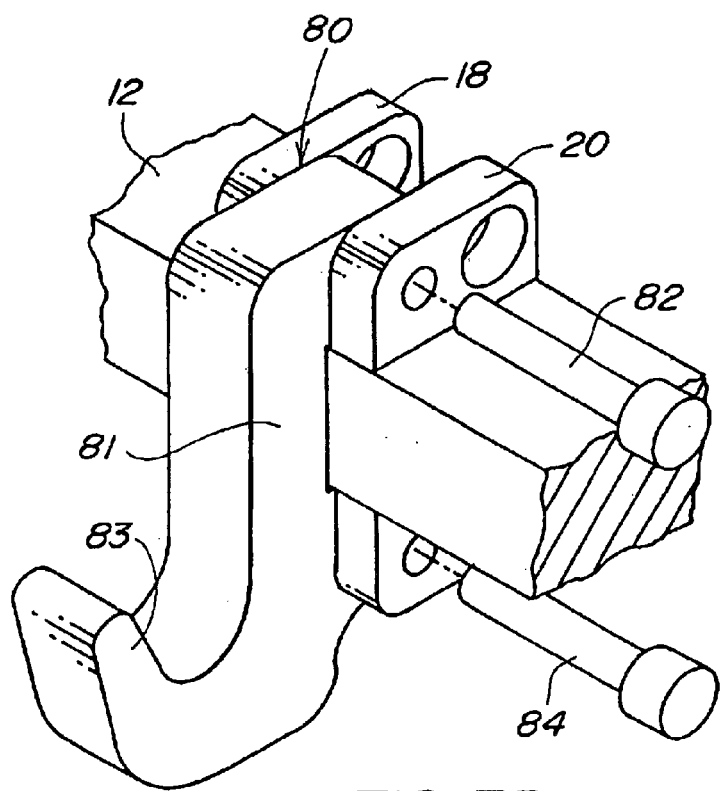
FIG. 3B is a perspective partially exploded detail view of the hook of FIG. 3A mounted to the cross member of FIG. 1.

Referring now to FIG. 3A, a category III center hook 80 includes a base member 81 and a hook member 83 which projects from a lower end of member 81. Base member 81 includes an upper mounting bore 77 and a lower mounting bore 79. Referring now to FIG. 3B, hook 80 is mounted to the tabs 18 and 20 of cross member 12 by pins 82 and 84 which extend through bores 30, 32 and 34, 36, respectively, and through corresponding bores 77 and 79 in the member 81.

Referring now to FIG. 4, a category IV center hook 90 includes a base member 91 and a hook member 92 which projects from a central portion of member 91. Base member 91 includes an upper mounting bore 94 and a lower mounting bore 96. Hook 90 may be mounted to the tabs 18 and 20 of cross member 12 by pins 82 and 84 which extend through bores 30, 32 and 34, 36, respectively, and through corresponding bores 94 and 96 in the member 91. By comparing FIGS. 3A and 4, it is apparent that the vertical distance between hook member 83 and upper mounting bore 77 of hook 80 is larger than the vertical distance between hook member 92 and upper mounting bore 94 of hook 90.

Figure 5:
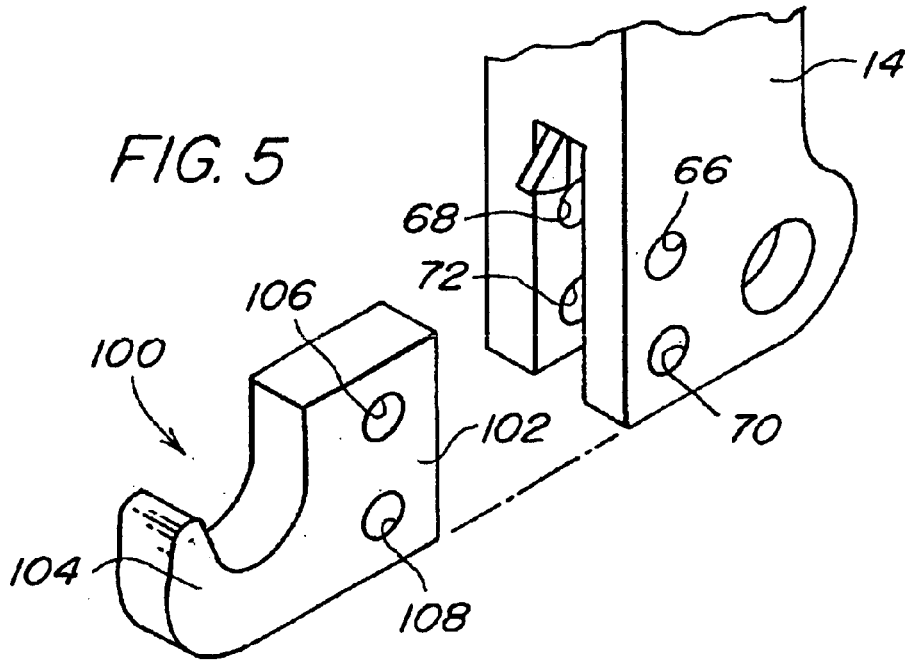
FIG. 5 is a perspective exploded view showing a category 4NL lower hook mounted to the side member of FIG. 1.
Figures 6, 7, 8:
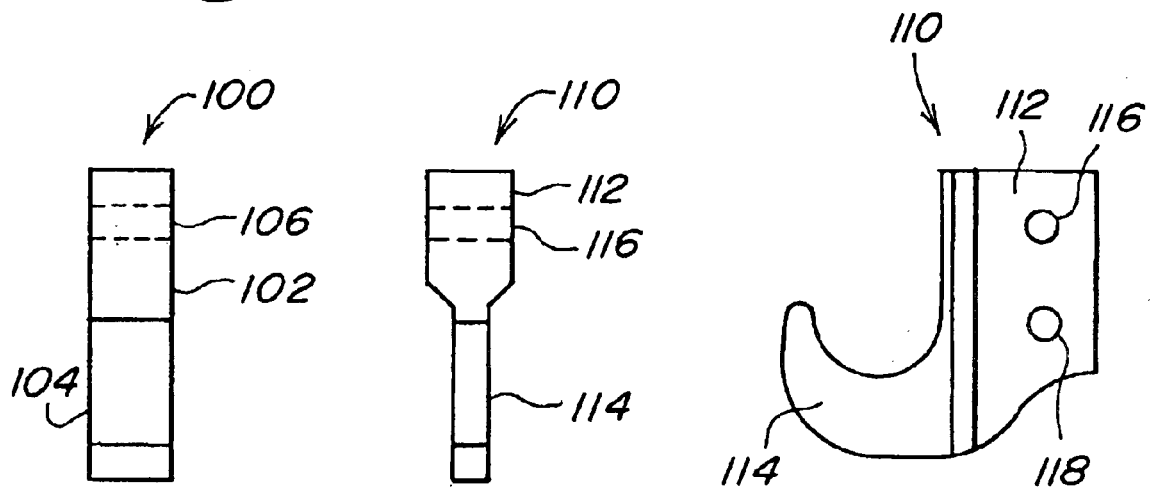
FIG. 6 is a top view of the hook of FIG. 5.
FIG. 7 is a side view of a category 3 lower hook which may be used in place of the hook of FIG. 5.
FIG. 8 is a top view of the hook of FIG. 7.

Referring now to FIGS. 5 and 6, a category IV lower hook 100 includes a base member 102 and a hook member 104 which projects from a lower end of member 102. Base member 102 includes an upper mounting bore 106 and a lower mounting bore 108. Referring now to FIG. 5, hook 100 is mounted side member 14 by pins (not shown) which extend through bores 66, 68 and 70, 72, respectively, and through corresponding bores 106 and 108 in the member 102.

Referring now to FIGS. 7 and 8, a category III lower hook 110 includes a wider base member 112 and a narrower hook member 114 which projects from a lower end of member 112. Base member 112 includes an upper mounting bore 116 and a lower mounting bore 118. Hook 110 may be mounted to the side member 14 by pins (not shown) which extend through bores 66, 68 and 70, 72, respectively, and through corresponding bores 116 and 118 in the member 112. By comparing FIGS. 6 and 8, it is apparent that the lower hook 100 is wider than the lower hook 110.

Figure 9:
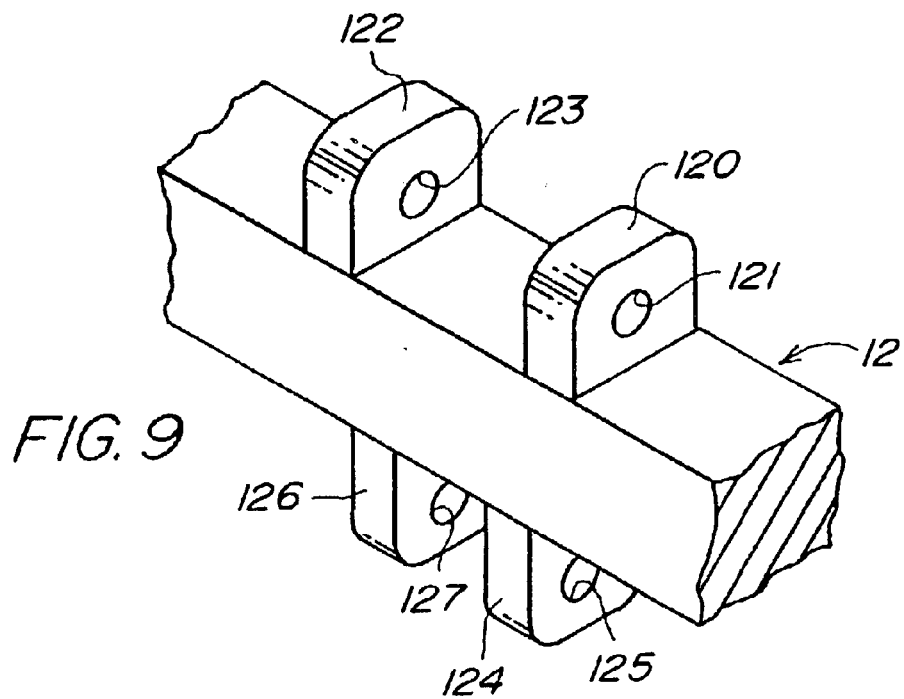
FIG. 9 is a perspective view of a center portion of an alternate embodiment cross member.
Figure 10:
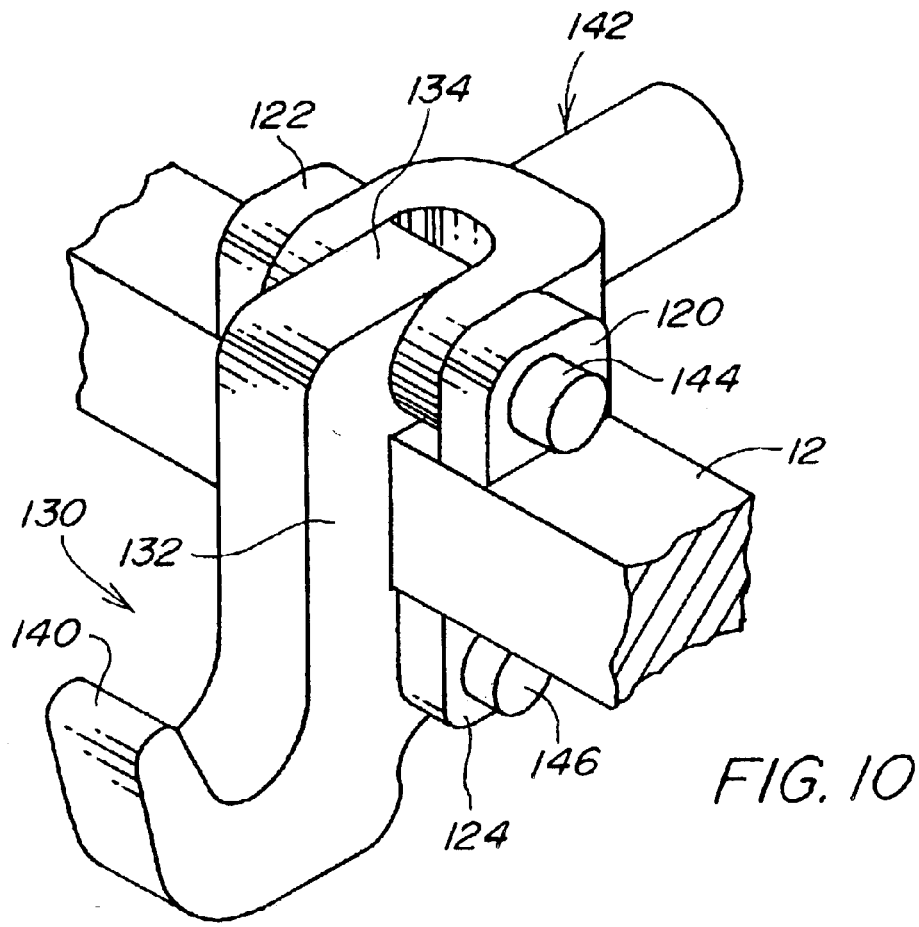
FIG. 10 is a perspective detail view showing the top hook of FIG. 3A mounted to the cross member of FIG. 9.

FIGS. 9 and 10 show an alternate embodiment of the central portion of the cross member and an alternate upper hook member 130 for use therewith. Referring to FIG. 9, a pair of upper mounting tabs 120 and 122 are spaced apart and project upwardly from a top surface of cross member 12. A pair of lower mounting tabs 124 and 126 are spaced apart and project downwardly from a bottom surface of cross member 12. Tabs 120 and 122 include, respectively, a pair of aligned bores 121 and 123 for use in coupling the frame 10 to a tractor (not shown). Tabs 124 and 126 also include a pair of rear aligned hook coupling bores 125 and 127.

Referring now to FIG. 10, hook 130 includes a base member 132 with an upper end 134 received by a forked end of an upper hitch draft link 142 and by tabs 120 and 122 and held in place by pin 144. A lower end of base member 132 is held in place between tabs 124 and 126 by pin 146. A hook prong 140 projects generally upwardly from base member 132.

With this invention, the upper and lower hooks may be exchanged to allow for different mast height (vertical distance between lower hooks and upper center hook), pin sizes, and hook widths such as are required by the standards for category III and IVNL implements and quick couplers. The user can easily change the quick coupler implement side from a category III to a category IVN depending on what implement they are working with. Because the hooks are separate parts, the material properties of each can be chosen to allow for better strength and wear without significant cost increase.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the claims.

I claim:

1. A coupling mechanism comprising:

a frame having a cross member and left and right side members projecting from the cross member;

the cross member having a pair of spaced apart upper mounting tabs projecting from an upper surface of the cross member, each upper mounting tab having a mounting bore extending therethrough;

the cross member having a pair of spaced apart lower mounting tabs projecting from a lower surface of the cross member, each lower mounting tab having a lower mounting bore extending therethrough;

the right side member having a pair of spaced apart right mounting tabs projecting from a lower end of the right side member, each right mounting tab having a mounting bore extending therethrough;

the left side member having a pair of spaced apart left mounting tabs projecting from a lower end of the left side member, each left mounting tab having a mounting bore extending therethrough;

a first upper hook having first dimensional characteristics;

a second upper hook having second dimensional characteristics which are different from the first dimensional characteristics, either of said first or second upper hooks being mountable to the cross member;

a first right lower hook having first dimensional characteristics;

a second right lower hook having second dimensional characteristics which are different from the first dimensional characteristics, either of said first or second right lower hooks being mountable to the right side member;

a first left lower hook having first dimensional characteristics;

a second left lower hook having second dimensional characteristics which are different from the first dimensional characteristics, either of said first or second left lower hooks being mountable to the right side member.

2. The coupling mechanism of claim 1, wherein:

a category 4 coupler is formed when the first hooks are mounted to the cross member and the side members.

3. The coupling mechanism of claim 1, wherein:

a category 3 coupler is formed when the second hooks are mounted to the cross member and the side members.

4. The coupling mechanism of claim 1, wherein:

each upper mounting tab having a further mounting bore extending therethrough for use in coupling to a center hitch link.

5. The coupling mechanism of claim 1, wherein:

each right and left mounting tab includes a further mounting bore extending therethrough for use in coupling to a hitch draft link.

6. The coupling mechanism of claim 1, further comprising:

one of the first and second upper hooks has a forked upper end forming a pair of ears separated by a space, said space being capable of receiving an end of upper hitch connecting link.

* * * * *